(12) United States Patent
Weiss et al.

(10) Patent No.: US 11,370,244 B2
(45) Date of Patent: Jun. 28, 2022

(54) WRITING, DRAWING, MARKING AND/OR COSMETIC DEVICE

(71) Applicant: STAEDTLER MARS GMBH & CO. KG, Nuremberg (DE)

(72) Inventors: Peter Weiss, Nuremberg (DE); Michael Schulze, Nuremberg (DE)

(73) Assignee: STAEDTLER MARS GMBH & CO. KG, Nuremberg (DE)

( * ) Notice: Subject to any disclaimer, the term of this patent is extended or adjusted under 35 U.S.C. 154(b) by 266 days.

(21) Appl. No.: 16/648,021

(22) PCT Filed: Sep. 12, 2018

(86) PCT No.: PCT/EP2018/074567
§ 371 (c)(1),
(2) Date: Mar. 17, 2020

(87) PCT Pub. No.: WO2019/068440
PCT Pub. Date: Apr. 11, 2019

(65) Prior Publication Data
US 2020/0276856 A1 Sep. 3, 2020

(30) Foreign Application Priority Data

Oct. 4, 2017 (DE) .................. 10 2017 009 364.4

(51) Int. Cl.
| | |
|---|---|
| *B43K 19/14* | (2006.01) |
| *B43K 5/00* | (2006.01) |
| *B43K 7/00* | (2006.01) |
| *B43K 8/00* | (2006.01) |
| *B43K 21/00* | (2006.01) |

(Continued)

(52) U.S. Cl.
CPC .............. *B43K 19/14* (2013.01); *A45D 40/20* (2013.01); *B43K 5/005* (2013.01); *B43K 7/005* (2013.01); *B43K 8/003* (2013.01); *B43K 21/006* (2013.01); *C04B 14/06* (2013.01); *C04B 14/22* (2013.01); *C04B 18/24* (2013.01); *C04B 24/383* (2013.01);
(Continued)

(58) Field of Classification Search
CPC .......... B43K 9/14; B43K 5/005; B43K 7/005; B43K 8/003; B43K 21/006; A45D 40/20; A45D 40/205; C04B 14/06; C04B 14/22; C04B 18/24; C04B 24/383; C04B 28/021; C04B 28/04; C04B 2103/32
USPC ........................ 401/101, 103, 221, 222, 249
See application file for complete search history.

(56) References Cited

U.S. PATENT DOCUMENTS 6,261,015 B1 * 7/2001 McCauley ............. B43K 24/02
401/116
7,959,368 B2 * 6/2011 Sheu .................... B43K 23/128
401/103

FOREIGN PATENT DOCUMENTS

DE 3049467 A1 7/1982
DE 202007015369 U1 1/2008
(Continued)

*Primary Examiner* — David J Walczak
(74) *Attorney, Agent, or Firm* — Lucas & Mercanti, LLP; Klaus P. Stoffel

(57) ABSTRACT

A writing, drawing, marking and/or cosmetic device, wherein the device includes at least one shaft and at least one inner body, wherein the at least one shaft is formed from concrete-containing material. The shaft at least partially surrounds the inner body. In the installation position the shaft is secured in an axial direction against axial displace- (Continued)

ment by a closing cover and a front part and a prestress is formed in the shaft in the axial direction via the closing cover and the front part.

11 Claims, 3 Drawing Sheets

(51) Int. Cl.
*A45D 40/20* (2006.01)
*C04B 14/06* (2006.01)
*C04B 14/22* (2006.01)
*C04B 18/24* (2006.01)
*C04B 24/38* (2006.01)
*C04B 28/02* (2006.01)
*C04B 28/04* (2006.01)
*C04B 103/32* (2006.01)

(52) U.S. Cl.
CPC ............ *C04B 28/021* (2013.01); *C04B 28/04* (2013.01); *C04B 2103/32* (2013.01)

(56) References Cited

FOREIGN PATENT DOCUMENTS

| DE | 202012000422 U1 | 2/2012 |
| WO | 9521063 A1 | 8/1995 |
| WO | 2015079347 A1 | 6/2015 |

\* cited by examiner

WRITING, DRAWING, MARKING AND/OR COSMETIC DEVICE

CROSS-REFERENCE TO RELATED APPLICATIONS

The present application is a 371 of International application PCT/EP2018/074567, filed Sep. 12, 2018, which claims priority of DE 10 2017 009 364.4, filed Oct. 4, 2017, the priority of these applications is hereby claimed and these applications are incorporated herein by reference.

BACKGROUND OF THE INVENTION

The invention relates to a writing, drawing, marking and/or cosmetic device having a shaft made of concrete-containing material.

Writing, drawing, marking and/or cosmetic devices and shafts for such devices, and concrete-containing materials in such devices are known in principle.

Devices of this type have at least one shaft and application means or application means storage used therein.

For example, DE 3049467 A1 discloses a manual writing device and a construction set for producing the outer jacket of a housing for a manual writing device. Here, the outer jacket consists of various differently decorated sleeve parts, which can be arranged in different orders if desired.

The disadvantage here is the complex construction/plastic construction for the required purpose.

Furthermore, DE 20 2007 015 369 U1 discloses a writing device having a writing lead and a housing. The housing here is made of a cement-bound building material, in particular concrete.

The disadvantage here is that the pen is very heavy due to its design and a mechanism cannot be integrated in the present form.

SUMMARY OF THE INVENTION

The object of the invention is therefore to provide a writing, drawing, marking and/or cosmetic device having a shaft which does not have the disadvantages mentioned above.

It is the task of creating a shaft, in particular a shaft made of concrete-containing material, which is integrated in the device in such a way that the shaft made of concrete-containing material, in particular in a thin-walled embodiment, is secured against breakage, or its risk of breakage is minimized.

The writing, drawing, marking and/or cosmetic device has at least one shaft and at least one inner body or consists of at least one at least one shaft and at least one inner body, the at least one shaft being made of concrete-containing material.

A shaft is to be understood in the following as a sleeve-shaped shaft or sleeve-shaped element.

This shaft is arranged with respect to the inner body in such a way that the shaft at least partially surrounds the inner body. In the mounting position of the shaft in the device, the shaft is secured or held in the axial direction against axial displacement by an end cover and a front part. A pretensioning is formed in the shaft in the axial direction via the inner body with the end cover and the front part.

The at least one inner body consists at least of at least one inner sleeve, an end cover and a front part, wherein means for adjusting the pretensioning are formed on the inner body between inner sleeve and front part and/or inner sleeve and end cover. At least one latching mechanism, an adhesive connection or other rigid and/or non-detachable connection can also be formed on the inner body between inner sleeve and front part and/or inner sleeve and end cover.

It is also possible for the inner sleeve and end cover and/or inner sleeve and front part to be formed in one part/in one piece, whereby the number of parts of the inner body can be reduced.

The concrete-containing material of the shaft can be in the form of concrete or fine concrete, but also as a mixture of concrete or fine concrete with fillers, such as, cellulose-containing material, in fibrous embodiment.

Such materials are durable for a long time, appear very valuable to the user, both in terms of appearance and feel.

It has proven to be advantageous when the end cover and/or front part are made of plastic to absorb the forces that occur, whereby no stress peaks occur in the absorbing region/clamping region.

Due to the pretensioning introduced into the shaft via the construction described above, it is possible to implement thin-walled embodiments having the concrete-containing material, although such a material is prone to breakage in thin layers.

FIGS. 1 to 4 are attached for a better representation of the solution according to the invention.

DETAILED DESCRIPTION OF THE INVENTION

Figure 1:
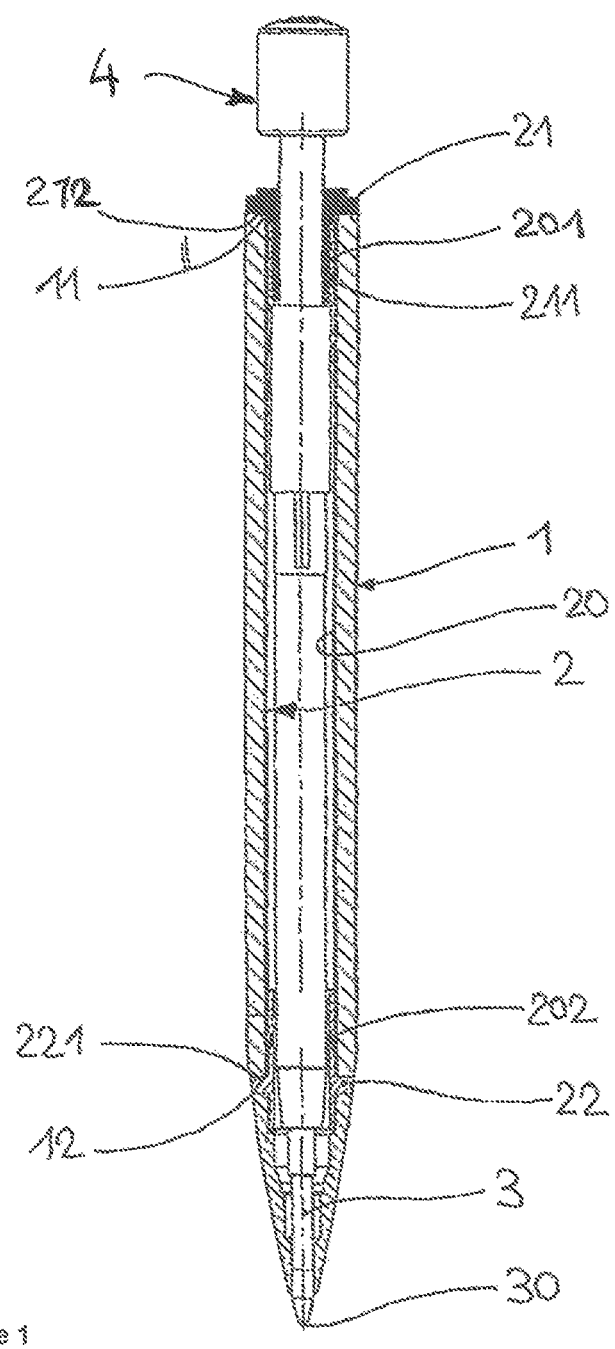
FIG. 1: section through a writing, drawing, marking and/or cosmetic device according to the invention.

FIG. 1 shows a device constructed according to the invention having adjusting means 201 for pretensioning a shaft 1 made of concrete-containing material.

In addition to the shaft 1 and adjusting means 201, the device has an application element 3 having a writing tip 30. Furthermore, an inner body 2, consisting of inner sleeve 20, adjusting means 201, latching mechanism 202, end cover 21 and front part 22, is arranged within the shaft. A feed mechanism, which is controlled by the latch 4, is integrated in this embodiment of the device.

The shaft 1, which at least partially encases the inner body 2, has a cover stop 212 and a support surface 221 in the axial direction, which securely hold the shaft 1 against axial displacement in the installed state. The front end face 12 and the rear end face 11 come to rest against the cover stop 212 and support surface 221 in the installed state. In the present embodiment, the end cover 21 has a cover thread 211 which interacts with the adjusting means 201 of the inner sleeve 20. A latching mechanism 202, which latches with the front part 22 of the inner body 2, is formed at the opposite end of the inner sleeve 20. It has proven to be advantageous when the front part 22 and/or the end cover 21 are made of plastic, whereby tension peaks during the application of force are avoided. The inner sleeve 20 is made of brass in the present case. Alternatively, plastic can also be used here for the inner sleeve. Due to this construction of the inner body 2, the installed shaft 1 can be continuously pretensioned via the rear end wall 11 and the front end wall 12 via the threaded connection/cover thread 211. It has been shown here that the stability of the shaft 1 against breakage of the quite thinly designed shaft wall is increased by such a pretensioning.

A pretensioning is thereby generated in which a pretensioning/clamping force acts on the shaft 1 with a tightening torque of the end cover 21.

In one embodiment, not shown, it also is possible to use an adjusting mechanism instead of a latching mechanism (202) on the inner body (2) which latches with the front part (22), for example, to connect a threaded connection between front part (22) and inner sleeve (20).

Figure 2:
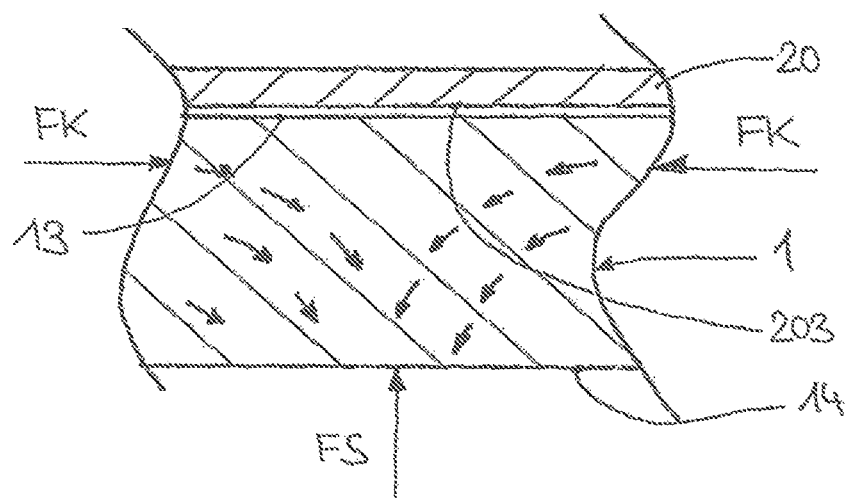
FIG. 2: schematic representation of the flow of force in a pretensioned sleeve according to the invention.

FIG. 2 shows a schematic representation of the flow of force in a shaft 1 pretensioned according to the invention. For better representation in enlarged form.

A clamping force FK is applied to the shaft via the pretensioning of the inner body. Here, the clamping force generates a pressure which is introduced distributed into the shaft 1 via the cover stop of the end cover and the support surface of the front part. The pressure applied to the shaft always moves away from the shaft in terms of force, wherein the only degree of freedom for the movement is radially outward. The shaft 1 made of concrete-like material is pretensioned towards the outside in this way. A curvature that cannot be seen with the naked eye in the radial direction away from the central axis, that is, in the radial direction, is achieved. This principle is known from bridge construction. A pretensioning in the radial direction to the center axis cannot take place, since the inner sleeve 20 counteracts there.

It should be noted here that it has proven to be advantageous when the outer surface 203 of the inner sleeve 20 is not firmly connected to the inner wall 13 of the shaft 1, since otherwise the force/pressure transmission and the resulting pretensioning of the shaft is not or cannot be—freely—formed.

If now, during use of the device having a shaft 1 made of concrete-like material, there is an impact and/or stress concentration with a force FS from the outside, in an extreme case perpendicular to the shell surface 14 in the direction of the center axis, then said force FS counteracts the pretensioning by deflecting the force FS by the pretensioning/pretensioning force towards the ends/end faces of the shaft.

Figure 3:
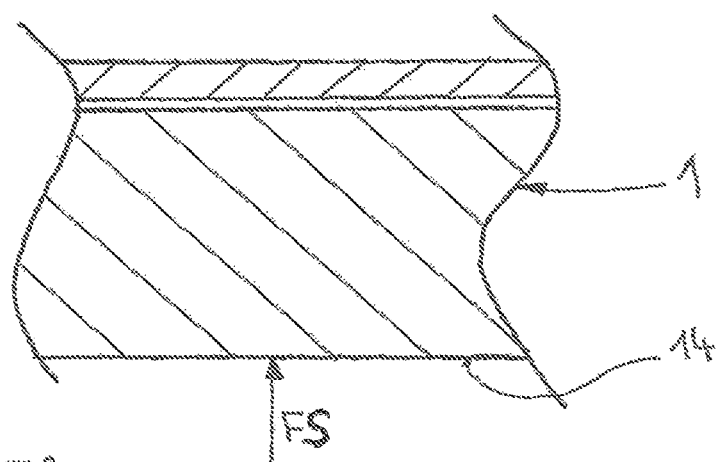
FIG. 3: schematic representation of the flow of force in a non-pretensioned sleeve.

FIG. 3, on the other hand, shows the schematic representation of the flow of force in a non-pretensioned shaft 1. Since the shaft does not or does not have to absorb any clamping force (FK) via its end faces, no internal flow of force can be represented. Such a non-pretensioned shaft 1 tends to break easily or crack in the installed state, as soon as a force FS strikes the shell surface 14 of the shaft 1, since no internal pretensioning forces counteract it.

Not shown in the figures, but in principle just as possible, the shaft can be a shaft/tubular shaft element of a closure cap for the claimed device. The principle of pretensioning is identical to the situation described above.

Likewise, the shaft can be a shaft/sleeve-shaped shaft element of a latch element. The principle of pretensioning is identical to the situation described above.

Figure 4:
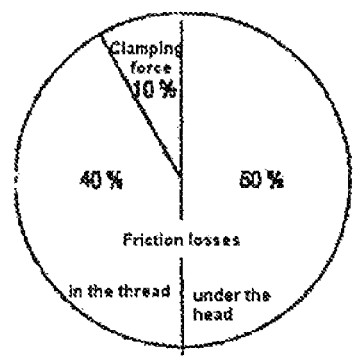
FIG. 4: schematic representation of a screw connection.

For a better understanding of the generation of the pretensioning/clamping force, FIG. 4 shows a representation of the conversion ratio from the tightening torque to the clamping force (FK).

The clamping force (FK) is the force that acts on the rear end face (11) and front end face (12) of the shaft (1).

Some formulations and a frame formulation for a concrete-containing material for producing a device having a shaft according to the invention are listed below.

Example 1: Fine Concrete

| | |
|---|---|
| Cement | 23% by weight |
| Ash | 16% by weight |
| Water | 11.5% by weight |
| Sand | 49% by weight |
| Superplasticizer | 0.5% by weight |

Example 2: Concrete Material Having a Density of the Mixture of Density 0.23 g/cm3 for Processing in the Extrusion Process

| | |
|---|---|
| White Portland cement | 1.00 kg |
| Glass beads | 0.90 kg |
| Water | 1.60 kg |
| Tylose 4000 | 0.20 kg |
| Cellulose fibers | 0.04 kg |

Frame Example: Concrete Casting Compound

| | |
|---|---|
| Cement | 40-60% by weight |
| Quartz flour | 20-30% by weight |
| Water | 12-22% by weight |
| Superplasticizer | 2-5% by weight |
| Cellulose fibers | 3-9% by weight |

The shafts for the devices according to the invention can be produced by extrusion or casting molds.

These manufacturing methods allow the shafts to be made of concrete and concrete-like material with different/any outside and inside cross-sections

POSITION LIST

1 shaft
   11 rear end face
   12 front end face
   13 inner wall
   14 shell surface
2 inner wall
   20 inner wall
   201 adjusting means
   202 latching mechanism
   203 outer surface
   21 end cover
   211 cover thread
   212 cover stop
   22 front part
   221 support surface
3 application element
   30 writing tip
4 latch

The invention claimed is:

1. A writing, drawing, marking or cosmetic device, comprising: at least one shaft; at least one inner body, wherein the at least one shaft is made of concrete-containing material, wherein the at least one shaft at least partially surrounds the at least one inner body; an end cover; and a front part, the end cover and the front part being arranged to hold the at least one shaft against axial displacement in an axial direction in a mounting position, and to create a pretensioning in the shaft in the axial direction via the end cover and the front part.

2. The device according to claim 1, wherein, the at least one inner body has at least one inner sleeve, the end cover and the front part.

3. The device according to claim 2, further comprising means for adjusting the pretensioning, the means for adjusting pretensioning being formed on the at least one inner body, between the at least one inner sleeve and the end cover.

4. The device according to claim 2, wherein at least one latching mechanism, an adhesive connection or other rigid connection is formed on the at least one inner body between the at least one inner sleeve and the end cover.

5. The device according to claim 2, wherein the at least one inner sleeve and the front part form a single piece.

6. The device according to claim 2, further comprising means for adjusting the pretensioning, the means for adjusting pretensioning being formed on the at least one inner body, between the at least one inner sleeve and the front part.

7. The device according to claim 2, wherein at least one latching mechanism, an adhesive connection or other rigid connection is formed on the at least one inner body between the at least one inner sleeve and the front part.

8. The device according to claim 2, wherein the at least one inner sleeve and the end cover form a single piece.

9. The device according to claim 1, wherein the concrete-containing material of the shaft is concrete or fine concrete.

10. The device according to claim 1, wherein the concrete-containing material is a mixture of concrete with cellulose-containing material.

11. The device according to claim 1, wherein at least one of the end cover and the front part is made of plastic to absorb occurring forces.

\* \* \* \* \*